(12) United States Patent
Lai

(10) Patent No.: US 9,390,039 B2
(45) Date of Patent: *Jul. 12, 2016

(54) PROVIDING A FINE-GRAINED ARBITRATION SYSTEM

(71) Applicant: INTEL CORPORATION, Santa Clara, CA (US)

(72) Inventor: Siaw Kang Lai, Penang (MY)

(73) Assignee: Intel Corporation, Santa Clara, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/169,515

(22) Filed: Jan. 31, 2014

(65) Prior Publication Data

US 2014/0149620 A1 May 29, 2014

Related U.S. Application Data

(63) Continuation of application No. 12/877,871, filed on Sep. 8, 2010, now Pat. No. 8,667,197.

(51) Int. Cl.
*G06F 13/36* (2006.01)
*G06F 13/364* (2006.01)
*G06F 13/362* (2006.01)

(52) U.S. Cl.
CPC .......... *G06F 13/364* (2013.01); *G06F 13/3625* (2013.01)

(58) Field of Classification Search
USPC .................................. 710/113–124, 240–244
See application file for complete search history.

(56) References Cited

U.S. PATENT DOCUMENTS

| 3,781,821 A | 12/1973 | Roth |
| 4,161,779 A | 7/1979 | Spencer et al. |
| 4,682,282 A | 7/1987 | Beasley |
| 5,151,994 A | 9/1992 | Wille et al. |
| 5,164,938 A | 11/1992 | Jurkevich et al. |
| 5,239,631 A | 8/1993 | Boury et al. |
| 5,241,632 A | 8/1993 | O'Connell et al. |
| 5,440,752 A | 8/1995 | Lentz et al. |
| 5,572,686 A | 11/1996 | Nunziata et al. |
| 5,778,200 A | 7/1998 | Gulick |

(Continued)

FOREIGN PATENT DOCUMENTS

| JP | 2008176482 | 7/2008 |
| TW | 200802098 | 1/2008 |
| TW | 200825907 | 6/2008 |

OTHER PUBLICATIONS

Patent Cooperation Treaty, International Search Report mailed Mar. 20, 2012 in international application No. PCT/US2011/047038.

(Continued)

*Primary Examiner* — Paul R Myers
(74) *Attorney, Agent, or Firm* — Trop, Pruner & Hu, P.C.

(57) ABSTRACT

In one embodiment, the present invention includes a method for selecting a requester to service during an arbitration round, and updating counters associated with the selected requester including a command unit counter and a data unit counter, determining if the counters are in compliance with corresponding threshold values, and if so granting a transaction for the selected requester, and otherwise denying the transaction. Other embodiments are described and claimed.

20 Claims, 5 Drawing Sheets

(56) References Cited

U.S. PATENT DOCUMENTS

| | | | |
|---|---|---|---|
| 5,896,539 A | 4/1999 | Arimilli et al. | |
| 5,996,037 A | 11/1999 | Emnett | |
| 6,073,132 A | 6/2000 | Gehman | |
| 6,209,053 B1 | 3/2001 | Kurts | |
| 6,347,351 B1 | 2/2002 | Osborne et al. | |
| 6,553,036 B1 | 4/2003 | Miller et al. | |
| 6,574,688 B1 | 6/2003 | Dale et al. | |
| 6,618,778 B1 | 9/2003 | MacCormack | |
| 6,631,433 B1 | 10/2003 | Paluzzi | |
| 6,636,482 B2 | 10/2003 | Cloonan et al. | |
| 6,651,125 B2 | 11/2003 | Maergner et al. | |
| 6,735,653 B2 | 5/2004 | O Mathuna et al. | |
| 6,754,786 B2 * | 6/2004 | Suzuki | G06F 13/1673 710/240 |
| 6,804,738 B2 | 10/2004 | Weber | |
| 6,954,811 B2 | 10/2005 | Vishnu | |
| 7,080,174 B1 | 7/2006 | Thorsbakken et al. | |
| 7,107,376 B2 | 9/2006 | Asano et al. | |
| 7,149,828 B2 | 12/2006 | Hayashi et al. | |
| 7,231,475 B1 | 6/2007 | Singla et al. | |
| 7,284,080 B2 | 10/2007 | Lin et al. | |
| 7,349,998 B2 * | 3/2008 | Hirose | G06F 13/126 710/119 |
| 7,350,003 B2 | 3/2008 | Gish et al. | |
| 7,359,322 B2 | 4/2008 | Khurana et al. | |
| 7,472,213 B2 | 12/2008 | Fukuyama et al. | |
| 7,525,986 B2 | 4/2009 | Lee et al. | |
| 7,685,346 B2 | 3/2010 | Teh et al. | |
| 8,104,054 B2 | 1/2012 | Weaver et al. | |
| 8,307,138 B2 | 11/2012 | Mace et al. | |
| 8,464,066 B1 | 6/2013 | Price et al. | |
| 8,667,197 B2 * | 3/2014 | Lai | G06F 13/364 710/113 |
| 2004/0059879 A1 | 3/2004 | Rogers | |
| 2005/0160188 A1 | 7/2005 | Bogin et al. | |
| 2006/0039333 A1 | 2/2006 | Pirzada et al. | |
| 2006/0101179 A1 | 5/2006 | Lee et al. | |
| 2008/0091866 A1 | 4/2008 | Cox et al. | |
| 2008/0288689 A1 | 11/2008 | Hoang et al. | |
| 2010/0316050 A1 | 12/2010 | Baykal et al. | |

OTHER PUBLICATIONS

Taiwan Patent Office, Office Action mailed Oct. 7, 2015, In Taiwanese Patent Application No. 100129077.

China Patent Office, Office Action mailed Sep. 18, 2015 in Chinese Patent Application No. 201180053442.7.

* cited by examiner

PROVIDING A FINE-GRAINED ARBITRATION SYSTEM

This application is a continuation of U.S. patent application Ser. No. 12/877,871, filed Sep. 8, 2010, the content of which is hereby incorporated by reference.

BACKGROUND

A computer system typically includes many different system components that communicate with each other via different types of interconnects such as shared links or direct or point-to-point links Some systems have begun to incorporate so-called system-on-a-chip (SoC) devices in which multiple components are incorporated on a single semiconductor die. Furthermore, some SoCs can be incorporated as an embedded device into various other systems that are not personal computer (PC)-based.

Regardless of the type of system, as the number of components seeking to communicate increases, the likelihood of contention for resources such as interconnect bandwidth, destination components and so forth increases also. To prevent deadlocks and stalls in a system, an arbiter may be present to receive requests from multiple agents and arbitrate the requests to provide access grants to resources of the system. In some systems, arbitration is performed according to a priority privilege in which a certain number of grants are allowed to each requester to avoid a higher priority requester from starving lower priority requesters. Such priority schemes may provide for a static, dynamic or increment-based priority. Grant operation typically starts from the highest priority requester and proceeds to the lowest priority requester. In some systems, the lower priority requester can only receive a grant when higher priority requesters have no active requests or have exhausted their grant count.

Current arbitration schemes typically lack control over allocation of bandwidth and can lead to starvation of low priority requesters, particularly under heavy/bursty traffic and when wider data transfer length is supported and more and more peripherals are present in a system.

DETAILED DESCRIPTION

Figure 1:
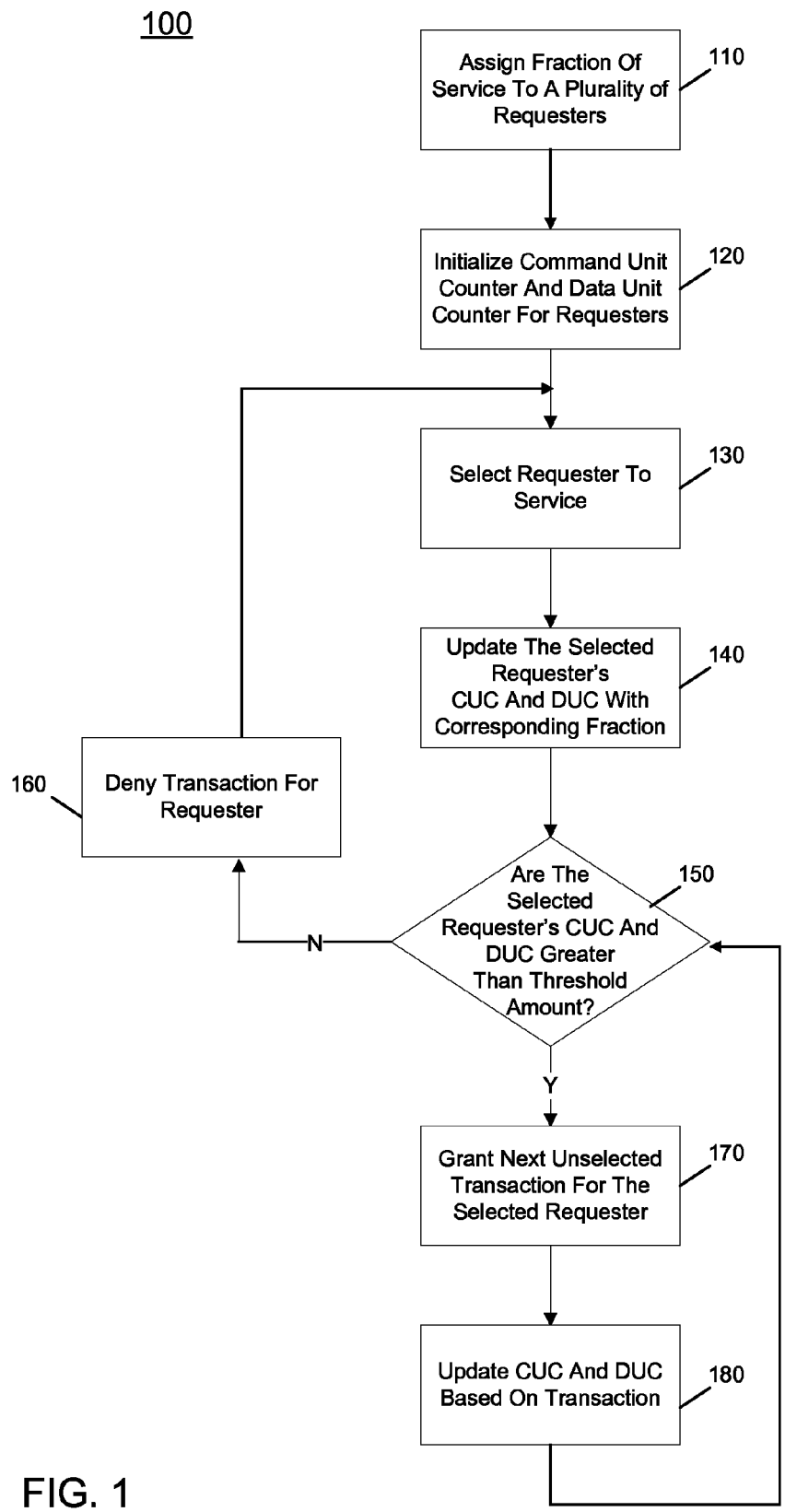
FIG. 1 is a flow diagram of a method in accordance with one embodiment of the present invention.

In various embodiments, fine-grained bandwidth control may be realized for priority-based arbitration schemes. While the scope of the present invention is not limited in this regard, many implementations may be used in connection with a system-on-a-chip (SoC). Many such SoCs have multiple agents interconnected via a shared address bus and shared data bus (SASD) interconnection system. For example, common and converged intellectual property (IP) interface protocols, such as an advanced microcontroller bus architecture (AMBA) advanced extensible interface (AXI), or open core protocol (OCP)-based architectures provide for modular adoption of different IP blocks, which can enable broad IP reuse and quick time-to-market integration across various systems such as microcontrollers, SoCs and so forth. As these devices, which typically have a SASD interconnection architecture, implement greater numbers of resources, complexity arises exponentially for a linear growth in heterogeneous SoC integration and IP board reuse levels. Thus an interconnect arbitration mechanism in accordance with an embodiment of the present invention may provide improved access to such interconnect to enable higher speed communication and reduced latencies, providing an interconnect fabric that can meet performance and Quality of Service (QoS) goals and be adaptable to a variety of applications.

In various embodiments, a priority-based arbitration scheme (which may be, for example, a static priority, dynamic priority, or increment priority) may be used to control communications over a SASD interconnection system. More particularly, embodiments may provide a fine-grained bandwidth control method that enables effective and fair bandwidth allocation across a wide range of on-chip communication traffic characteristics and prevent starvation even in the situation of bursty traffic, and in light of large data transfers.

In one embodiment, a bandwidth control algorithm may be employed on a priority-based bus arbitration scheme over the SASD interconnection system. In this algorithm, a method may consider a stream of transaction requests of a given transfer size for accompanying data, and provide for fine-grained control over arbitration grants such that the possibility of starvation of lower priority devices is minimized or avoided.

In such algorithm, a channel-based assignment of service to each of a plurality of channels, each of which may have an independent flow of data provided through separate physical request queues, can be realized. Each of the channels may be associated with a given requester, e.g., agent, bus master or so forth. Each such channel may be assigned a fraction of service for a given arbitration round, which corresponds to a sequence of visits to consecutive channels based on priority order, before returning to the starting channel. In one embodiment, this fraction of service may be measured independently for units of command and data. In such an implementation, the command units may be associated with a counter called a Command Unit Counter (CUC) (which in one embodiment can be initialized to zero), while the data units may be associated with a counter called a Data Unit Counter (DUC) (which in this embodiment can also be initialized to zero).

Channels may be serviced in a priority manner. When a given channel is selected for service, its CUC and DUC may be adjusted by the programmable fraction of command and data units allocated for that channel. For purposes of discussion, assume herein an increment-based arbitration scheme in which for each round, the counters for each requester may be incremented with their programmable fraction of service for the arbitration round. Given this increment to begin an arbitration round, embodiments may further operate to decrement these counters as transactions are granted to a given requester during the arbitration round, as discussed further below.

As long as both the CUC and DUC are greater than zero, transactions can be granted to the selected channel. With each transaction, the CUC is decremented, e.g., by 1, and the DUC is decremented, e.g., by the size of the data burst consumed by the transaction. In this embodiment, when the CUC becomes zero or the DUC becomes zero or negative for the corresponding channel, the next channel (e.g., in priority order) may be selected for service. Thus if a channel overdraws its data account by some amount, it is penalized by this amount in the next arbitration round.

Referring now to FIG. 1, shown is a flow diagram of a method in accordance with one embodiment of the present invention. As shown in FIG. 1, method 100 may be used to initialize an arbitration system and to perform arbitration between a plurality of system requesters during normal operation. Note that while discussed herein for a priority-based interconnect arbitration scheme, embodiments are not so limited and may be applicable to other arbitration systems such as round-robin based.

As seen in FIG. 1, method 100 may begin by assigning a fraction of service to multiple requesters (block 110). These multiple requesters may correspond to different agents, e.g., of an SoC, each of which may be associated with a different channel, and which may be allocated to a given request queue. This assignment may be based on information stored in a non-volatile storage of the system, e.g., a table accessible to system software such as a basic input/output system (BIOS) or other such system software. While the scope of the present invention is not limited in this regard, in many embodiments the assignment of a fraction of service for a given arbitration round may be based on priority of the different requesters. As such, different fractions can be allocated to different requesters, and different unit values for both command and data units may occur.

Next at block 120, a command unit counter and a data unit counter may be initialized for each of the requesters. In one embodiment, multiple such counters may be provided, with a corresponding command unit counter and data unit counter associated with each requester. In one embodiment, the initialization value may be set at zero, although the scope of the present invention is not limited in this regard. At this point, initialization operations for setting up the arbitration system may be completed. Also understand that these initialization operations may be implemented by various actors, including both the system software as well as an arbitration logic which in one embodiment may be part of an interconnect system. However, the arbitration logic may be present in various locations in different systems.

Still referring to FIG. 1, at this time normal system operation may begin. When pending requests are present in one or more request queues for the different channels, a requester may be selected for servicing (block 130). For example, for a given arbitration round, each of the multiple requesters may be provided service according to their fraction, where the arbitration round provides access to, e.g., a shared interconnect, to requests of each of the requesters in sequence according to their given priority. After selection of a first requester (block 130), control passes to block 140, where the counters associated with this requester may be updated with the fraction of service for that requester. For example, each counter may be incremented with a value that corresponds to the fraction. Specific examples are discussed below. Then control passes to diamond 150, where it may be determined whether both of the counters associated with the requester have a value greater than a threshold amount, e.g. zero. Note that while discussed as associated with a count value of zero, understand the scope of the present invention is not limited in this regard and in different embodiments, other values may be provided as a predetermined threshold value against which the counters can be compared. Thus it may be determined if the count values are in compliance with a corresponding threshold. If the counts are below the corresponding thresholds, control passes to block 160 where a transaction may be denied for that requester. Control then passes back to block 130 for selection of the next requester for handling service requests in the given arbitration round.

Figure 3:
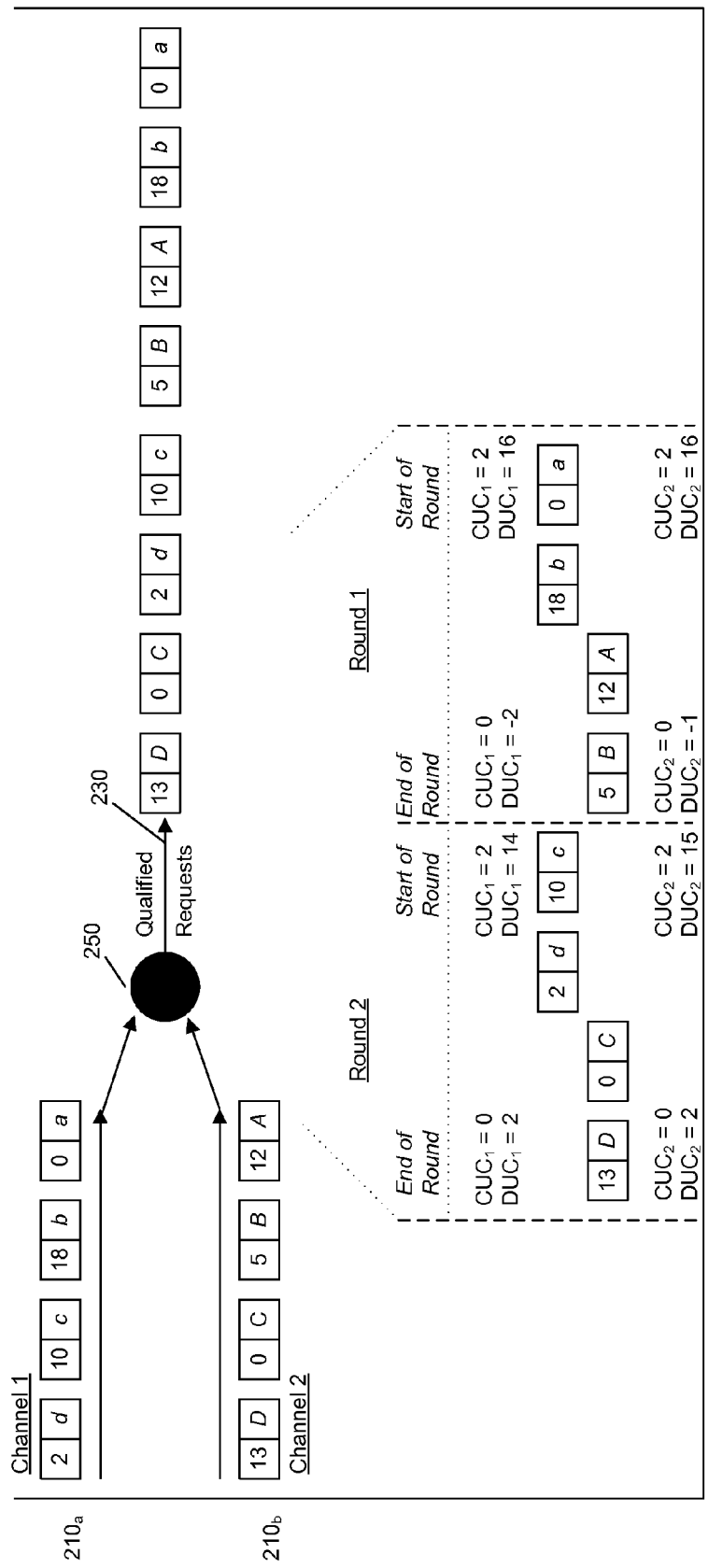
FIG. 3 is a graphical illustration of the operation of a bandwidth control algorithm in accordance with an embodiment of the present invention.

If instead at diamond 150 it is determined that both counters are greater than the threshold (e.g., zero), control passes to block 170. As seen at block 170, when the counters are greater than this threshold amount a next unselected transaction may be granted for the requester. Accordingly, a given transaction stored in the corresponding request queue may be provided to the interconnect under arbitration. Further details regarding this granting of unselected transactions is shown in FIG. 3 described below. Control then passes to block 180 where the counters may be updated based on the transaction. More specifically, in the embodiment described herein both counters may be decremented accordingly. For example, the command counter may be decremented by a value of one, while the data counter may be decremented by a data width of the data associated with the transaction. For a pure command transaction, this counter value may not change, as no data may be communicated. However, for a data transaction such as a write to memory, a read completion or so forth, the data counter may be decremented by the width of the corresponding data involved in the transaction operation. Control then passes back to diamond 150 discussed above. While shown with this particular implementation in the embodiment of FIG. 1, understand the scope of the present invention is not limited in this regard.

Figure 2:
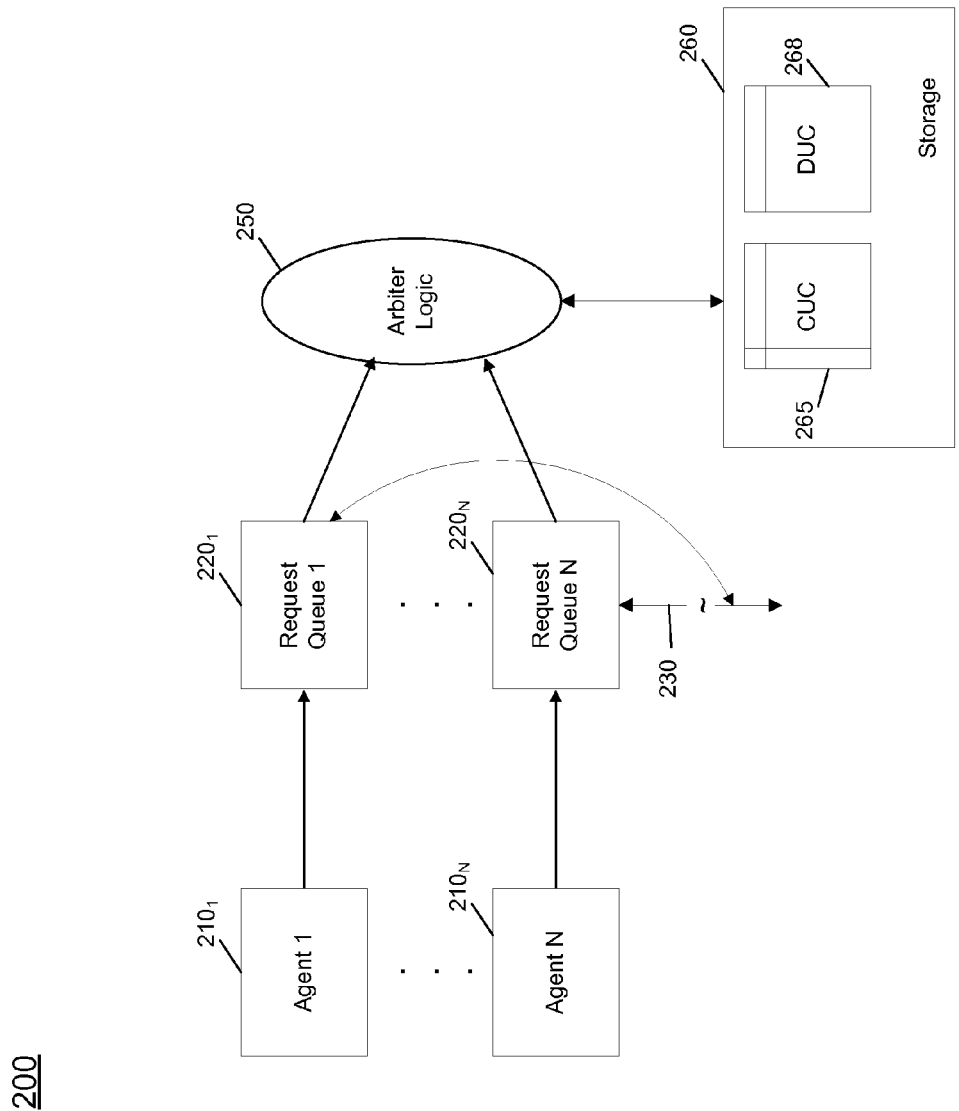
FIG. 2 is a block diagram of a portion of a system in accordance with an embodiment of the present invention.

Referring now to FIG. 2, shown is a block diagram of a portion of a system in accordance with an embodiment of the present invention. As shown in FIG. 2, system 200 may be a portion of an SoC, a multi-core processor, a multi-chip module, or any other semiconductor device. Still further, in some implementations the system may correspond to a personal computer (PC)-based system including many separate components.

As seen in FIG. 2, system 200 may include a plurality of agents 210 (e.g., $210_1$-$210_n$). While the scope of the present invention is not limited in this regard, such agents may be processing cores, specialized functional units, controllers, or so forth. As seen, each such agent may be coupled to and associated with a corresponding request queue 220 (e.g., $220_1$-$220_n$). Each request queue may store requests for transactions from the associated agent. As an example, each request queue may be a first in first out (FIFO) or other type of buffer. As seen, each of these request queues may be coupled to a shared interconnect 230, e.g., a SASD interconnect.

As further seen in FIG. 2, each request queue may be coupled to an arbiter logic 250. As discussed above, arbiter logic 250 may be a standalone logic, or may be part of another processing entity such as a core or other processing unit. In various embodiments, logic 250 may include various hardware, firmware and/or software. In general, arbiter logic 250 may operate in accordance with method 100 set forth in FIG. 1 to grant access to shared interconnect 230 to the given channels based on their priority and in accordance with the fine-grained arbitration method described herein.

To enable such operations, arbiter logic 250 may be coupled to a storage 260, which may be a portion of a cache memory or other temporary storage to store information associated with the various counters. In some embodiments, storage 260 may be a set of registers that are associated with arbiter logic 250. As seen, a first counter 265, which may correspond to a command unit counter, and a second counter 268, which may correspond to a data unit counter, are present. Understand that each of these counter circuits may include multiple counters or entries to thus provide a single one of each of these counters (e.g., a single CUC and a single DUC)

for each corresponding agent. While shown with this particular implementation in the embodiment of FIG. 2, understand the scope of the present invention is not limited in this regard. That is, in many embodiments, a given system will include many more components and provide for different connections between the devices.

For example, in one embodiment, logic 250 may include counters for the active channel, and which can be provided with the values stored in the corresponding CUC and DUC counters from storage 260 upon selecting the channel for arbitration. Still further, logic 250 may include other circuitry such as adders, subtractors, comparators, AND gates and so forth to perform arbitration methods in accordance with an embodiment of the present invention.

FIG. 3 graphically illustrates the operation of a bandwidth control algorithm in accordance with an embodiment of the present invention. In FIG. 3, two input request queues $210_a$ and $210_b$ may correspond to two channels (e.g., channel 1 and channel 2) and thus two agents or requesters. As seen, the first channel contains transactions a, b, c, d, in that order in request queue $210_a$, and second channel contains transactions A, B, C, and D in that order in request queue $210_b$. In the example of FIG. 3, both request queues may be assigned a same fraction of 2 units of command and 16 units of data per arbitration round (note that in various implementations the fractions of command and data for each channel can be different). In the illustration of FIG. 3, in addition to its label, each transaction is also marked with a request data transfer size. In the textual portion describing multiple arbitration rounds 1 and 2, FIG. 3 shows the values of the CUCs and DUCs associated with each request queue (at round beginning and end) as the arbitration scheme executes. The CUC and DUC of each request queue is incremented in each arbitration round by the fraction associated with that request queue. When the CUC becomes zero or the DUC becomes zero or negative, then the next channel in the priority order is selected for service.

As seen at the start of round 1 in FIG. 3, the CUC and DUC of both channels 1 and 2 are initially set at values of 2 and 16, respectively, corresponding to their allocated fraction of service. After granting transactions a (of size zero: for example, a read request without data transfer) and b (of size 18), the CUC and DUC of channel 1 becomes 0 and −2, which is negative. Thus no further transactions may be granted to channel 1 during this arbitration round. Instead, channel 2 is selected for next service, where two transactions, A and B, with combined size of 2 command and 17 data units, are granted before the CUC for channel 2 becomes 0 and its corresponding DUC become negative (i.e., −1).

At this point, the arbitration round is complete. Accordingly, a new arbitration round begins, and the arbiter returns to the starting channel (channel 1) to start this next arbitration round. As seen at the beginning of this next arbitration round (round 2), a fresh fraction of 2 command and 16 data units may be added to the CUC and DUC for channel 1, leaving a value of 2 for command and 14 for data, which now allows requests c and d to be granted in the second arbitration round. At this point, again the CUC for channel 1 reaches zero, and thus no further transactions may be granted to channel 1 during this arbitration round. Instead, channel 2 is next selected for next service during this second arbitration round. Here, a fresh fraction of 2 command and 16 data units may be added to the CUC and DUC for channel 2 respectively, leaving a value of 2 for command and 15 for data, which now allows requests C and D to be granted in the second arbitration round for channel 2.

In one embodiment, the fractions of service for command and data may be programmable, and may further be proportional to the bandwidth of the command and data buses. And as long as both the CUC and DUC are greater than zero (in the embodiment discussed above), transactions can be granted from that channel, and the CUC is decremented by 1 and the DUC is decremented by the width of data burst that will be consumed by the transaction. Then when the CUC becomes zero or the DUC becomes zero or negative, the channel's turn ends and the remaining excess use of data bandwidth can be carried over onto the next arbitration round as a credit.

Thus in various embodiments, accurate bandwidth control on a command bus and data bus can be accomplished even in the presence of widely variable data length requests. Still further, independent control on the fraction of command and data for each channel may provide for adaptability across a wide range of communication traffic characteristics. Meanwhile, the programmability of the fraction of command and data may allow such values to be set after silicon (e.g., configured at boot time by a boot read only memory (ROM) configuration firmware and/or by an operating system (OS)). Yet further, these fractions may be configured on the fly at run-time by a driver or platform system software or platform manageability engine whenever the current assigned fraction of command or data is determined to be inadequate to platform-dependent scheduling policies, quality of service (QoS) dimensions, or fair share of the system resources.

And some implementations, the dynamic updating of fractions assigned to different requesters can be performed on a regular basis during normal system operations. Or, these fractions of service may be updated based on certain metrics that can be analyzed during system operation. While the scope of the present invention is not limited in this regard, in some embodiments a controller such as a core, specialized processor or other logic unit (and possibly in some embodiments the arbiter itself) may execute code, e.g., a driver or platform system software or other such software, to perform analysis and possible updating of the fractional service allocations.

Figure 4:
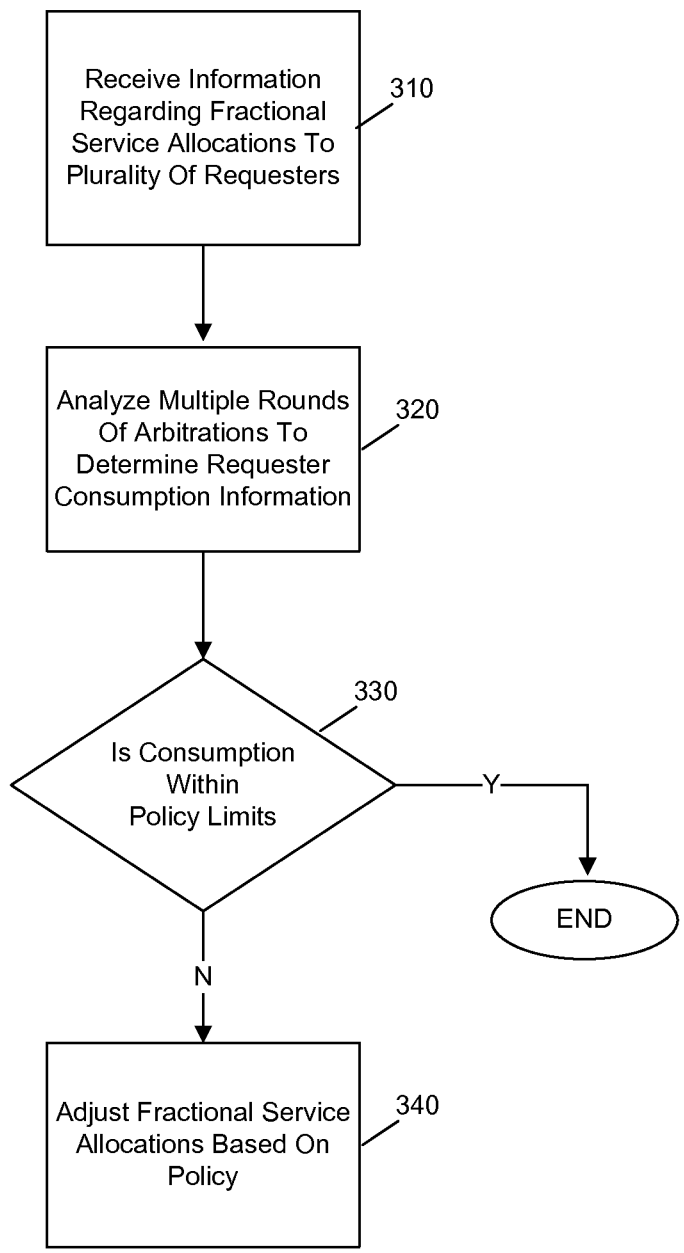
FIG. 4 is a flow diagram of a method in accordance with an embodiment of the present invention.

Referring now to FIG. 4, shown is a flow diagram of a method in accordance with an embodiment of the present invention. As shown in FIG. 4, method 300 may be performed during system operation to determine whether allocated fractions are appropriate and if not, to take corrective action. In one embodiment, a controller such as a general processing core or other agent can perform the method.

As seen, method 300 may begin by receiving information regarding fractional service allocations to a plurality of requesters (block 310). For example, the controller may receive information stored in a non-volatile storage to indicate the fractional service allocation provided to each of multiple requesters. For example, with reference back to FIG. 3, assume only two requesters, each of which may be provided with an equal fractional service allocation (e.g., the same number of command units and data units to be allocated for each arbitration round).

Method 300 may continue by analyzing multiple rounds of arbitration to determine requester consumption information (block 320). For example, as the multiple arbitration rounds proceed, the controller may determine requester consumption information, e.g., based on analysis of an amount of pending transactions in request queues associated with the different requesters. Of course in other embodiments, other manners of determining requester consumption information may be realized. For example, instead of or in addition to information regarding the request queues, information regarding the amount of bandwidth on a shared interconnect allocated to each of the requesters can also be considered.

Next, control passes to diamond 330 where it may be determined whether the consumption is within policy limits, based on this requester consumption information. For example, predetermined policy limits may be set to indicate, e.g., an amount of interconnect bandwidth that is to be allocated to each requester. In one embodiment, these policy limits may correspond to percentages of bandwidth to be allocated to each of the requesters. Of course the policy limits may take other forms such as usage time. If it is determined that the consumption is within these policy limits, method 300 may conclude. Otherwise if it is determined that the consumption is not within the policy limits, control passes to block 340 where the fractional service allocations may be adjusted based on the policy. For example, differing amounts of fractional service allocations may be set for each of the requesters.

After such updating, each of the requesters may receive unequal amounts of the fractional service allocations. For example, a first (and higher priority) requester may receive more command units as its fractional service allocation (e.g., by a 2:1 ratio) and additionally this first requester also may receive additional data unit allocations (e.g., again according to a 2:1 or another such ratio). These updated fractional service allocations may then be stored within the same non-volatile storage from which the original allocations were obtained (e.g., overwriting the original allocations). Or where the original allocations are set by firmware, the new allocations may be stored in another location such that on another powering of the system, the original allocations can be again used to set the fractional service allocations. While shown with this particular implementation in the embodiment of FIG. 4, understand the scope the present invention is not limited in this regard.

Figure 5:
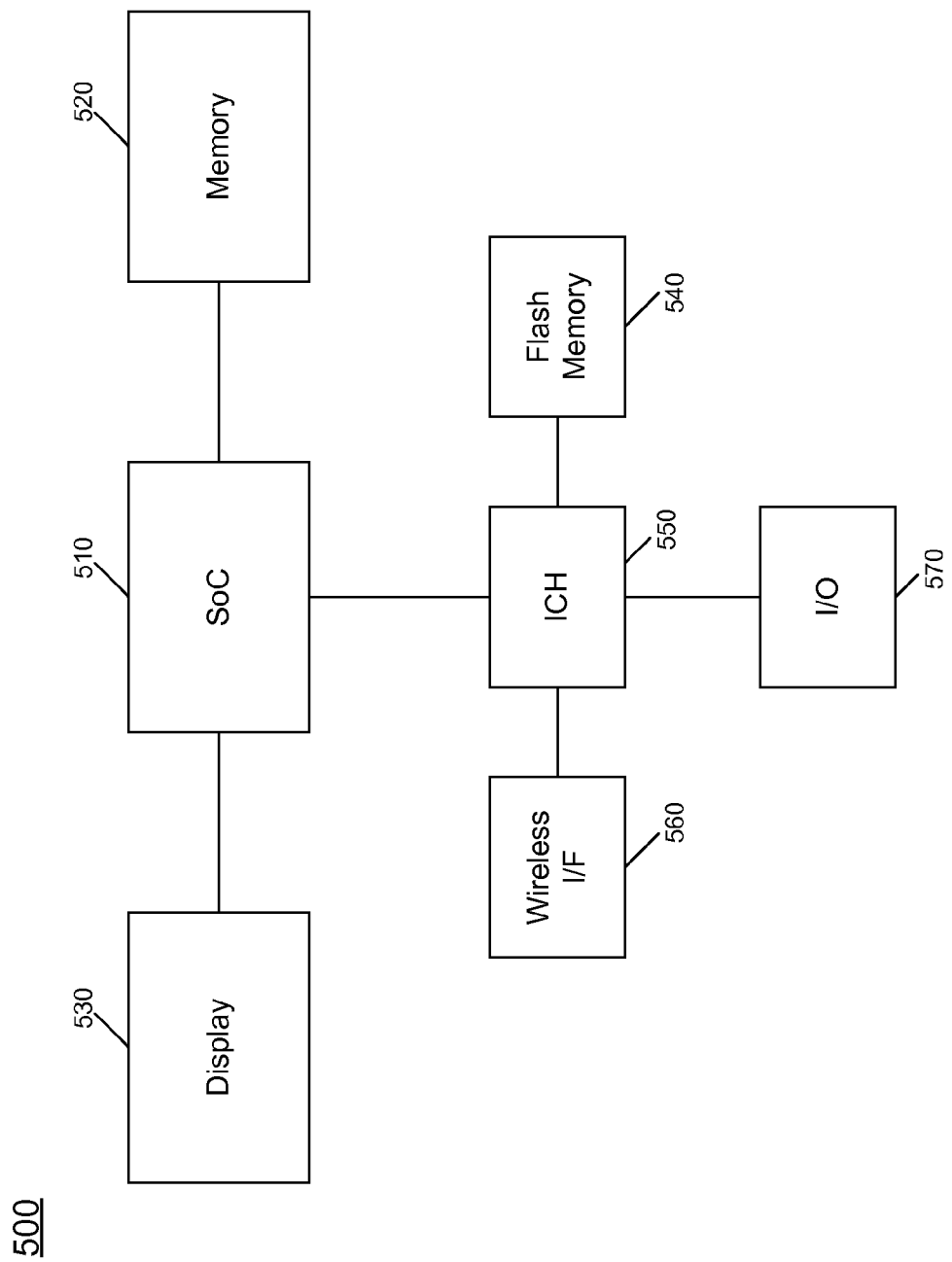
FIG. 5 is a block diagram of a system in accordance with one embodiment of the present invention.

Note that an SoC in accordance with an embodiment of the present invention may be of various types of designs including multi-core and many-core processor designs with additional agents such as cores, caches, accelerators, memory controllers and so forth. SoCs can be used in many different systems. As one particular example, a SoC in accordance with an embodiment of the present invention can be incorporated into a computer system such as a netbook computer. Referring now to FIG. 5, shown is a block diagram of a system in accordance with one embodiment of the present invention. As shown in FIG. 5, system 500 may be a netbook or other small form factor computer.

As seen, SoC 510 may be a SoC in accordance with an embodiment of the present invention such as described above regarding FIG. 2. A memory 520, which in one embodiment may be dynamic random access memory (DRAM), may be coupled to SoC 510, as the SoC may include an integrated memory controller. In addition, SoC 510 may be coupled to a display 530 such as a liquid crystal display (LCD), touch panel, or other such display, as the SoC may further include graphics functionality. In addition, SoC 510 may couple to an input/output controller hub (ICH) 550 that in turn may couple to various system components such as a flash memory 540 which in one embodiment may act as a mass storage system for the system, as its small form factor may be appropriate for a netbook or other small device. In addition, ICH 550 may couple to a wireless interface 560 that may enable communication, e.g., via a local area network (LAN) such as a Bluetooth™ connection, a wireless LAN (WLAN) in accordance with Institute of Electrical and Electronics Engineers (IEEE) 802.11 or another such standard. In addition, wireless interface 560 may further enable communication via a wide area network such as a cellular communication network. ICH 550 may further couple to one or more IO devices 570 such as a keyboard, mouse, pointer or other user interface device. While shown with this particular implementation in the embodiment of FIG. 5, the scope of the present invention is not limited in this regard.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a first counter circuit including a plurality of first counters each associated with one of a plurality of requesters of a system on a chip (SoC) and to store a count of command units allocated to the corresponding requester, each of the command units corresponding to a command portion of a transaction;
 a second counter circuit including a plurality of second counters each associated with one of the plurality of requesters of the SoC and to store a count of data units allocated to the corresponding requester, each of the data units corresponding to a data portion of a transaction; and
 an arbiter coupled to the first and second counter circuits to select one of the plurality of requesters and to grant a transaction of the selected requester access to an interconnect if the first and second counters associated with the selected requester are in compliance with a corresponding threshold value, and otherwise to deny the transaction of the selected requester access to the interconnect.

2. The apparatus of claim 1, wherein the apparatus comprises the SoC including a plurality of agents each corresponding to one of the plurality of requesters, and wherein granted transactions are to be communicated on the interconnect.

3. The apparatus of claim 1, wherein the arbiter is to grant a consecutive plurality of transactions for the selected requester, while at least one other requester is not granted any transactions.

4. The apparatus of claim 3, wherein the arbiter is to iteratively update the first and second counters after each of the consecutive plurality of transactions, and grant the consecutive plurality of transactions until at least one of the first and second counters is not in compliance with the corresponding threshold.

5. The apparatus of claim 1, further comprising a controller coupled to the arbiter, wherein the controller is to adjust a fraction of service allocated to at least some of the plurality of requesters based on requester consumption information.

6. The apparatus of claim 5, wherein the controller is to dynamically adjust the fraction of service.

7. The apparatus of claim 5, wherein the controller is to determine if the requester consumption information indicates that consumption is within a consumption policy limit, and to adjust the fraction of service if the consumption is not within the consumption policy limit.

8. A non-transitory storage medium including instructions to enable a machine to perform a method, comprising:
 selecting, in an arbiter of a system on a chip (SoC), one of a plurality of requesters for servicing, and thereafter updating a first counter and a second counter associated with the selected requester, wherein the first counter corresponds to a command unit counter to maintain a first count value associated with a command portion of a transaction and the second counter corresponds to a data unit counter to maintain a second count value associated with a data portion of the transaction;

determining if each of the first and second counters are in compliance with a corresponding threshold value for the first and second counters; and if so, granting a transaction for the selected requester, and otherwise denying the transaction for the selected requester.

9. The non-transitory storage medium of claim 8, wherein the method further comprises updating the first counter and the second counter based on the transaction.

10. The non-transitory storage medium of claim 9, wherein the method further comprises selecting the selected requester based on a priority level of the selected requester and a priority level of each of the plurality of requesters.

11. The non-transitory storage medium of claim 8, wherein the method further comprises granting a consecutive plurality of transactions for the selected requester, while at least one other requester is not granted any transactions.

12. The non-transitory storage medium of claim 11, wherein the method further comprises iteratively updating the first and second counters after each of the consecutive plurality of transactions.

13. The non-transitory storage medium of claim 12, wherein the method further comprises granting the consecutive plurality of transactions until at least one of the first and second counters is not in compliance with the corresponding threshold.

14. The non-transitory storage medium of claim 8, wherein the method further comprises responsive to the at least one of the first and second counters not being in compliance with the corresponding threshold, selecting a second requester to service.

15. The non-transitory storage medium of claim 8, wherein the first counter is not in compliance if it reaches a zero value, and the second counter is not in compliance if it reaches a zero value or a negative value.

16. The non-transitory storage medium of claim 15, wherein the method further comprises debiting the second counter by an amount of the negative value at a beginning of a next arbitration round.

17. The non-transitory storage medium of claim 8, wherein the method further comprises assigning a fraction of service for an arbitration round to each of the plurality of requesters.

18. A system comprising:
a first agent to perform operations on data;
a second agent to perform operations on data;
a shared interconnect coupled to the first and second agents;
a command unit counter to store a count of command units allocated to the first and second agents, each of the command units corresponding to a command portion of a transaction;
a data unit counter to store a count of data units allocated to the first and second agents, each of the data units corresponding to at least a part of a data portion of a transaction; and
an arbiter coupled to the command unit counter and the data unit counter, and to select one of the first and second agents to control access to the shared interconnect based on the count of the command unit counter and the count of the data unit counter.

19. The system of claim 18, wherein the arbiter is to grant a consecutive plurality of transactions of the selected agent access to the shared interconnect, while transactions of the other agent are not granted access to the shared interconnect.

20. The system of claim 18, further comprising a controller coupled to the arbiter, wherein the controller is to dynamically adjust a fraction of service allocated to the first and second agents based on comparison of consumption information of the first and second agents to corresponding consumption policy limits.

* * * * *